Patented July 20, 1954

2,684,376

UNITED STATES PATENT OFFICE 2,684,376

PROCESS FOR THE SIMULTANEOUS OXIDATION AND HALOGENATION OF STEROIDS AND COMPOUNDS OBTAINED THEREBY

Eugene P. Oliveto, Long Island City, N. Y., and Emanuel B. Hershberg, West Orange, and Corinne E. Gerold, Lyndhurst, N. J., assignors to Schering Corporation, Bloomfield, N. J., a corporation of New Jersey No Drawing. Application October 22, 1951, Serial No. 252,587

19 Claims. (Cl. 260—397.45)

The present invention relates to an improved process for the manufacture of 3-keto steroids, and particularly of 21-substituted-17(a)-hydroxy-3,11,21-triketo pregnanes, and to new and useful steroid compounds obtained thereby.

More specifically, the invention relates to the production of new steroid compounds suitable for the manufacture of physiologically active preparations, and particularly for use as intermediates for the manufacture of cortisone.

It is the general object of the invention to provide an improved process for the manufacture of valuable keto steroids by the simultaneous oxidation and halogenation of normal (A/B-cis) 3,17(a)-dihydroxy pregnanes which may have a keto group in the 11-position, by the use of N-halogeno aliphatic acid imides and amides, and especially of N-bromo-succinimide.

It is a further object of the invention to convert the normal 4 and/or 21-halogeno-3-keto-10,13-dimethyl nuclearly saturated pregnanes so obtained into physiologically active steroids or into compounds suitable for use as intermediates for the manufacture of such compounds, and especially of cortisone.

Other objects and advantages of the invention will be apparent from the following more detailed description thereof.

In accordance with the present invention, nuclearly saturated, 3,17-dihydroxy pregnanes with normal configuration at $C_5$ are subjected to the action of N-halogeno aliphatic acid imides or amides under such conditions that the 3-hydroxyl group is converted into a keto group while at the same time halogen is introduced either into the 4-position of the nucleus or into the side chain or in both positions. As the N-bromo aliphatic acid imides generally give best results, and particularly N-bromo succinimide, the invention will be described in further detail by reference to such latter reagent, but it will be understood that other N-bromo aliphatic acid imides and amides, such as N-bromo acetamide, and with suitable modification of the reaction conditions, also the N-chloro aliphatic acid imides and amides can be employed.

We have found that by reacting nuclearly saturated normal pregnanes (having rings A/B in cis-configuration) with N-bromo succinimide in the presence of no more than a trace of hydrohalic acid, such as the trace of hydrobromic acid that usually accompanies the commercially available N-bromo succinimide, nuclear bromination of the pregnanes in the 4-position can be effected at approximately room temperatures; while oxidation of the 3-hydroxyl group that may be present in the starting steroid may under certain conditions be simultaneously effected. This reaction is in contrast to the known reaction of N-bromo succinimide on steroid compounds of the 17-hydroxy-pregnane type which is made to occur in the presence of a considerable concentration of hydrobromic acid, in which known reaction the 21-methyl group is brominated. The process of the present invention is conducted also in the absence of any basic material, such as pyridine, sodium acetate and the like which act to bind hydrobromic acid; and is conducted also in the absence of any oxidizable solvent, such as primary and secondary alcohols, although there may be present an oxidizable substance whose rate of oxidation, however, is considerably slower than that of any oxidizable hydroxy group forming part of the steroid compound. We have discovered that when the A and B rings are in the cis-position and a hydroxyl group is attached to the 3-carbon, oxidation of the 3-hydroxyl to ketonic oxygen will occur simultaneously with the bromination which occurs mainly at the 4-position, and to some extent at the 21-position.

The invention contemplates the bromination of A/B-cis compounds falling within the following general formula, coupled with simultaneous oxidation of a nuclear secondary alcohol group:

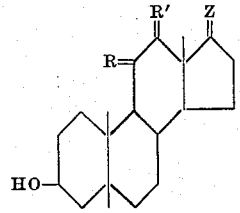

wherein R and R' are each

or $H_2$, no more than one of them, however, being O; and Z is one of the usual groups attached to the 17-position in 10,13-dimethyl steroids, such as =O,

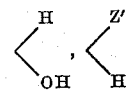

and

Z' being, for example, the 17-group of cholanic acid and its 17-degradation radicals, namely

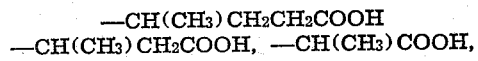

and —COOH, or the groups characteristic of sapogenins and pseudo-sapogenins, or those characteristic of sterols (for example, cholesterol, stigmasterol, etc.), or the group

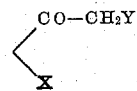

wherein Y is H, O-acyl (like O-acetyl, O-propionyl or O-benzoyl), O-alkyl (like O-methyl or O-ethyl), or O-aralkyl (like O-benzyl), while X is H or OH. By our process, halogenation occurs either in the nucleus or in the side chain, and in the latter case at the C-21 position where the compounds are pregnane compounds.

The character of the reactions effected by the present invention will be illustrated by the preparation of intermediates for the manufacture of cortisone, as in the following equation:

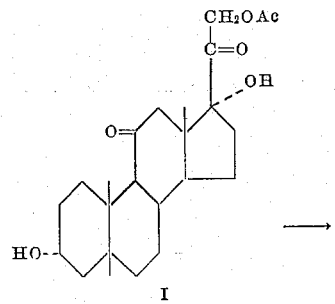

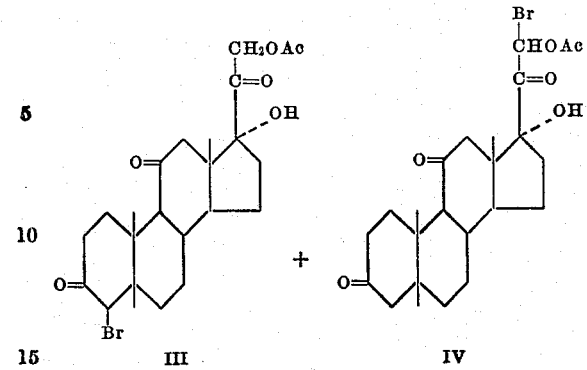

An essential sequence of reactions in one of the alternative syntheses of cortisone acetate is as follows:

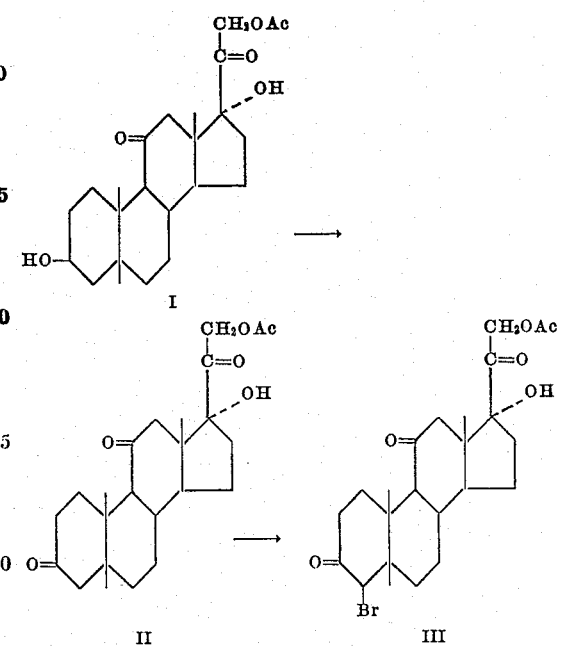

The oxidation of the 3α-hydroxyl has been accomplished previously with chromic acid and with N-bromoacetamide. Subsequent bromination has usually been carried out in acetic acid.

We have found that oxidation of, for example, 21 - acetoxy - 11,20 - diketo - 3(α),17(α) - pregnandiol (I) with N-bromosuccinimide in methylene chloride and t-butanol in the absence of pyridine does not give the expected non-halogenated 3-keto compound (II), but instead a mixture of two isomeric monobromotriketones. The two bromides have also been obtained by direct bromination of 21-acetoxy-3,11-20-triketo-17(α) hydroxy-pregnane (II) in methylene chloride and t-butanol. These have been identified as 4-bromo-21-acetoxy-3,11,20-triketo-17(α)-hydroxypregnane (III) and 21-bromo-21-acetoxy-3,11,20 - triketo - 17(α) - hydroxypregnane (IV)

(with the 4-bromo compound predominating) by the following sequence of reactions:

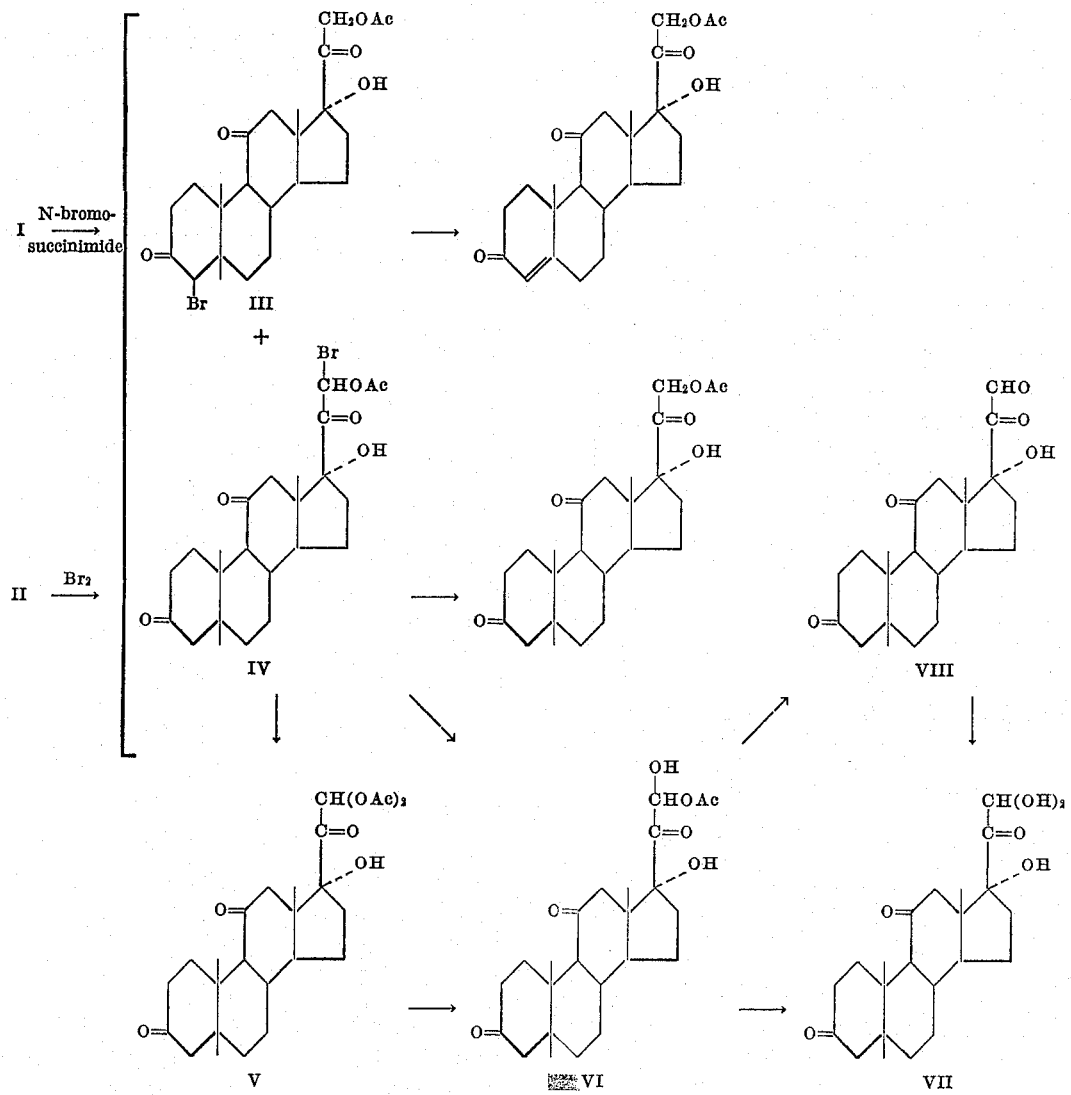

By starting with 3,17-androstandiol or with 3-hydroxy-17-keto androstane, 2,4-dibromo-3,17 androstandione can be obtained which can serve as an intermediate for the preparation of estrone and its derivatives, such as estradiol. By controlling the rate of oxidation it is possible to obtain a preferential oxidation of 3,17-androstandiols (with simultaneous bromination), yielding 2-bromo or 2,4-dibromo-3-keto-androstanol-17.

Where the starting compound contains an 11 or 12-hydroxyl group, N-bromo succinimide will oxidize the secondary hydroxyl to a keto group and simultaneously introduce bromine at the adjacent 12- or 11-position, yielding the 11-keto-12-bromo, or the 11-bromo 12-keto steroid, which can be further treated to produce valuable physiologically active steroids or intermediates for the manufacture of such steroids. Thus, by the splitting off of HBr from an 11-bromo-12-keto steroid, a $\Delta^{9(11)}$-12-keto compound results which is a valuable intermediate in the manufacture of cortisone. In this way, for example, the naturally occurring bile acids having a 12-hydroxy group can be simultaneously oxidized and brominated in the C-ring and then converted to the corresponding $\Delta^{9(11)}$ unsaturated compound.

The reactions of the present invention are preferably made to take place in a tertiary alcohol solvent, such as t-butyl alcohol, t-amyl alcohol, methylcyclohexanol and similar non-oxidizable alcohols. In general, any hydroxylic solvent whose rate of oxidation is slower than that of the steroid can be used. However, it is possible to use also an aqueous solvent, such as aqueous acetone, and even to conduct the reaction in a two-phase system, such as water and benzene, water and chloroform, etc.

As already mentioned, the process of the present invention is conducted in the presence of a small quantity of hydrohalic acid, which acts catalytically. We prefer to employ solvents like tertiary alcohols which are capable of binding hydrohalic acid, so that the hydrohalic acid liberated during the course of the reaction is not allowed to accumulate; however, the rate of combination of the solvent with the acid should be such that there is maintained in the reaction mixture a small quantity of free hydrohalic acid of the order of about 0.001 to 0.02 mole. By limiting the quantity of free acid in this way, simultaneous oxidation and halogenation are caused to take place. Where the solvent is of acid character, such as acetic acid, large quantities (up to 25%) of the 2-bromide are obtained. Because of the high cost of the starting materials, this compound must be reclaimed, and to this end a treatment with zinc is necessary. In the process of the present invention, the by-product is the 21- bromide, and this material can be reclaimed by a much milder reaction, as with sodium iodide.

The following examples present satisfactory procedures for carrying out the invention, but it is to be understood that they are presented for purposes of illustration only and not as indicating the scope of the invention.

*Example 1*

A solution of 5.0 grams of 21-acetoxy-11,20-diketo-3,17($\alpha$)- dihydroxy pregnane in 100 ml. dry t-butanol was combined with a solution of 5.5 grams of N-bromo succinimide in 100 ml. methylene chloride. The mixture was allowed to stand in an open flask overnight at room temperature. It was then shaken with an excess of dilute sodium sulfite solution and washed twice with water. After drying over sodium sulfate, the solvent was removed under reduced pressure. The residue was sludged for 10 minutes with 20 ml. of acetone; 80 ml. of ether were added and the sludging continued 10 minutes longer. The suspension was chilled and filtered, and the solid residue washed with cold ether. The product was the 4-bromide of dihydrocortisone acetate (4-bromo - 3,11,20 - triketo - 21 - acetoxy - 17($\alpha$)-hydroxypregnane). M. P. 200-203° C. with decomposition, $(\alpha)_D^{21} = +97.21°$ (acetone). This compound can be converted into cortisone acetate by dehydrohalogenation in known manner.

The acetone-ether filtrate was evaporated to dryness under reduced pressure, and the residue sludged with 2.5 ml. of acetone and 5 ml. of ether. The solid obtained was recrystallized from methylene chloride-hexane, yielding the 21-bromide of dihydrocortisone acetate (3,11,20-triketo-21-bromo-21-acetoxy-17α-hydroxypregnane). This compound can, in accordance with the invention, be further treated to convert it into various 21-substituted derivatives of dihydrocortisone, as illustrated in Examples 2 and 3, and in the following:

A solution of 0.25 g. of 3,11,20-triketo-21-bromo-21-acetoxy-17($\alpha$)-hydroxy pregnane in 4 ml. of glacial acetic acid was treated with 0.25 g. of sodium iodide at room temperature. After 2½ hours, the deep red solution was poured into water. The tan solid was filtered off, washed with water, and dried. Recrystallization from ethyl acetate yielded 0.12 g. of white crystals, M. P. 224-6°, $[\alpha]_D^{25} = +86.52°$ (C=1% in acetone). Two further recrystallizations, from ethyl acetate and aqueous methanol, did not change the melting point. The infra-red spectrum of this material was identical with that of authentic dihydrocortisone acetate (II) which had been purified by chromatography. The melting point of the mixture showed no depression.

*Example 2*

A mixture of 0.50 g. of 21-bromo-21-acetoxy-17($\alpha$) hydroxy-3,11,20-triketo-pregnane, 5 ml. of benzene, 10 ml. of glacial acetic acid and 0.35 g. of silver acetate was shaken for 65 hrs. at room temperature. The solids were then filtered off and thoroughly washed with chloroform. The filtrate was washed neutral, dried, and evaporated to dryness. Recrystallization of the residue from aqueous methanol yielded 0.45 g. of 21,21-diacetoxy - 17($\alpha$) - hydroxy-3,11,20-triketo-pregnane (V), M. P. 211-13°.

A solution of 0.09 g. of crude 21,21-diacetoxy-pregnan-17($\alpha$)-ol-3,11,20-trione in 8 ml. of methanol was combined with a solution of 0.20 g. potassium bicarbonate in 2 ml. of water. An intermediate white precipitate formed, which was dissolved by gentle warning for 5-10 minutes. The solution was allowed to stand at room temperature for 5 hours, diluted with water and extracted several times with methylene chloride. The combined organic extracts were washed once with water and the wash re-extracted once with methylene chloride. The solution was dried and evaporated, leaving 0.06 g. of a light tan solid, M. P. 174-9°. Recrystallization of this material from aqueous acetone yielded 0.03 g. of the hydrated glyoxal, VII, 17($\alpha$),21,21-trihydroxy-3,11,20-triketopregnane, M. P. 187-8°.

*Example 3*

A solution of 0.50 g. of 21-bromo-21-acetoxy-17($\alpha$)-hydroxy-3,11,20-triketo-pregnane in 4 ml. of 80% pyridine was allowed to stand 15 min. at roof temperature; the solution was then poured into ice water containing 4 ml. of 10 N sulfuric acid, and the precipitate was filtered off, washed thoroughly with water, and dried. Recrystallization from benzene yielded 0.42 g. of 21 - acetoxy-17($\alpha$),21-dihydroxy-3,11,20-triketo-pregnane (VI), M. P. 204.8-206° d.

A solution of 0.23 g. of crude 21-acetoxy-17($\alpha$),21 - dihydroxy - 3,11,20 - triketopregnane (VI) in 15 ml. of methanol was treated with 5 ml. of 0.5 N hydrogen chloride in methanol to which 1 ml. of water had been added. The solution was heated on the steam bath for 15 minutes, allowed to stand at room temperature for 22 hours, then poured into water and the product extracted several times with methylene chloride. The combined extracts were washed neutral, dried and evaporated, leaving 0.23 g. of a pale yellow solid, M. P. 161-4°. Recrystallization from benzene yielded 0.11 g. white crystals, M. P. 179-81° of 17($\alpha$)-hydroxy-3,11,20-triketo-pregnan - 21 - al (VIII).

When this material is allowed to stand exposed to the air, the hydrated form VII is obtained.

*Example 4*

To a solution of 3.3 grams of 17($\alpha$)-hydroxy-allopregnan-3($\beta$) ol-20-one in 65 cc. t-butanol were added 3.56 grams of N-bromo-succinimide in 70 cc. methylene chloride. At the end of 3⅓ hrs., 5 grams of sodium sulfite in 100 cc. water were added, and the methylene chloride layer separated, washed twice with water, dried, and evaporated in vacuo. The residue was recrystallized from ethanol—"Darco" to give 2-bromo-17($\alpha$) - hydroxyallopregnan-3-20-dione, M. P. 177-80° C. with decomposition, $(\alpha)_D + 45°$.

We claim:
1. Steroid compounds of the general formula

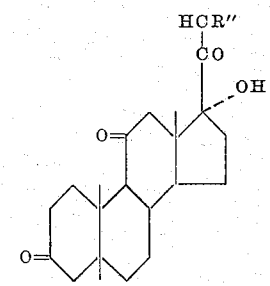

wherein R'' is a member of the group consisting of

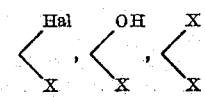

and

Hal standing for halogen and X for a member of the class consisting of acetoxy, propionoxy, and benzoyloxy.

2. Compounds of the formula

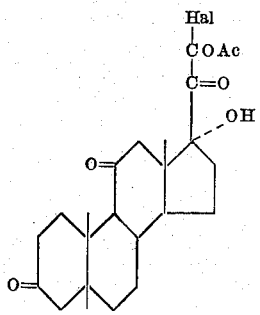

wherein Hal stands for halogen and Ac stands for the acyl group of a member of the class consisting of acetic, propionic and benzoic acids.

3. Compounds of the formula

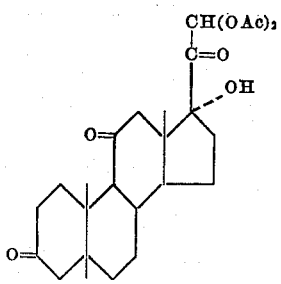

wherein Ac stands for the acyl group of a member of the class consisting of acetic, propionic and benzoic acids.

4. Compounds of the formula

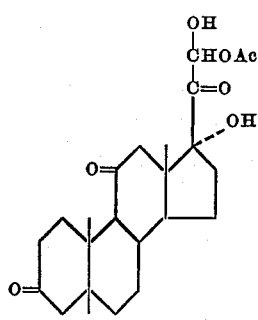

wherein Ac stands for the acyl group of a member of the class consisting of acetic, propionic and benzoic acids.

5. A compound of the formula

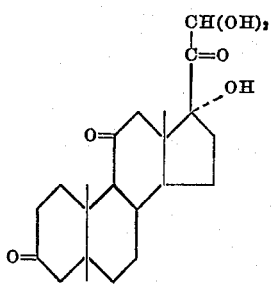

6. A compound of the formula

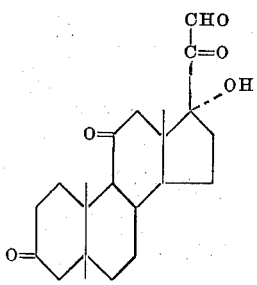

7. A compound as defined in claim 2 wherein Hal stands for bromine and Ac stands for the acyl group of a lower aliphatic carboxylic acid.

8. The compound

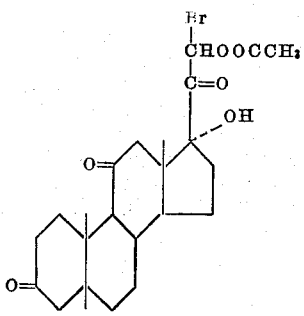

9. The compound

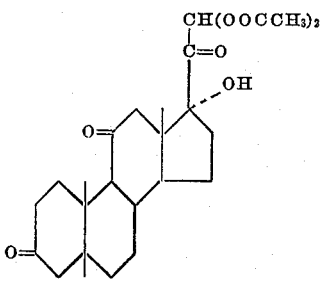

10. The compound

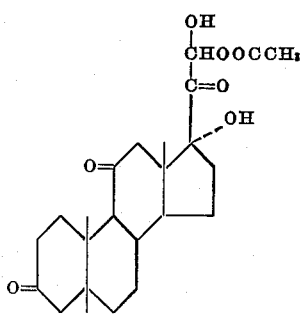

11. Process for the simultaneous oxidation and 4-halogenation of nuclearly hydroxylated steroids, which comprises reacting a hydroxy steroid whose A/B rings have the cis-configuration with an N-bromo-succinimide in the presence of a small proportion of hydrobromic acid and in a solvent capable of binding hydrobromic acid.

12. Process for the simultaneous oxidation and bromination of saturated 10,13-dimethyl steroids, which comprises reacting a compound of the formula

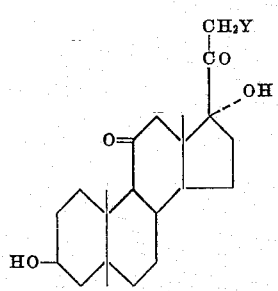

wherein Y is a member of the group consisting of H, OH, O-acetyl, O-propinyl, O-benzoyl, O-alkyl and O-aralkyl, with N-bromo succinimide in a solvent capable of binding HBr and in the presence of a low concentration of HBr until the secondary alcohol group is converted to a keto group and bromine is substituted in one of the 4- and 21-positions.

13. Process according to claim 12, wherein the reaction takes place in a tertiary alcohol solvent.

14. Process according to claim 12, wherein the reaction takes place in t-butyl alcohol.

15. Process for the manufacture of 4-bromo-3,11,20-triketo-21-acyloxy-17($\alpha$)-hydroxy pregnane, which comprises reacting 21-acyloxy-11,20-diketo-3,17($\alpha$)-dihydroxypregnane and wherein the acyloxy group is a member of the class consisting of acetoxy, propionoxy and benzoyloxy, with N-bromo succinimide in a solvent capable of binding HBr and in the presence of a low concentration of HBr.

16. Process according to claim 15, wherein the reaction takes place at approximately room temperature.

17. Process according to claim 16, wherein the reaction takes place in a mixture of t-butyl alcohol and methylene chloride.

18. Process for the simultaneous oxidation and 4-bromination of saturated 3-hydroxy-10,13-dimethyl steroids whose A/B rings have the cis-configuration, which comprises reacting such steroids with N-bromo succinimide in the absence of added acid and in the presence of a hydrohalide-binding solvent.

19. Process according to claim 18, wherein the rate of combination of the solvent with hydrobromic acid is such that there is maintained in the reaction mixture a catalytic concentration of hydrobromic acid of the order of 0.001 to 0.02 mole.

References Cited in the file of this patent

UNITED STATES PATENTS

| Number | Name | Date |
|---|---|---|
| 2,584,159 | Rosenkranz | Feb. 5, 1952 |